United States Patent [19]

Carlson et al.

[11] Patent Number: 4,600,622
[45] Date of Patent: Jul. 15, 1986

[54] SCREEN FOR SEPARATING AND CLASSIFYING PARTICULATE MATERIAL AND METHOD OF MAKING SAME

[75] Inventors: James D. Carlson, Carbondale, Pa.; Stephen L. Colucci, Mishawaka, Ind.

[73] Assignee: National-Standard Company, Niles, Mich.

[21] Appl. No.: 700,274

[22] Filed: Feb. 11, 1985

Related U.S. Application Data

[62] Division of Ser. No. 458,484, Jan. 17, 1983, abandoned.

[51] Int. Cl.⁴ .............................. B32B 3/10; B32B 3/24
[52] U.S. Cl. ................................... 428/135; 428/131; 428/134; 428/137
[58] Field of Search ..................... 210/498; 209/397; 428/131, 134, 135, 137

[56] References Cited

U.S. PATENT DOCUMENTS 3,843,476 10/1974 Kramer ........................... 209/397 X
3,857,751 12/1974 Jacobs ............................ 156/137 X Primary Examiner—Alexander S. Thomas
Attorney, Agent, or Firm—Bacon & Thomas

[57] ABSTRACT

A screen for separating and classifying smaller particles from larger particles of a particulate substance wherein the screen is of a planar configuration and made from a slab of synthetic material. The screen includes a plurality of spaced perforations formed by cutting the slab with a pressurized stream of fluid, which method of forming produces perforations of highly uniform configuration and dimensions, particularly when the slab is a composite comprising plural layers of different synthetic materials. The perforations are configured to compensate for foreshortening of their top openings and accelerated wear tendencies during use of the screen in an inclined disposition.

13 Claims, 8 Drawing Figures

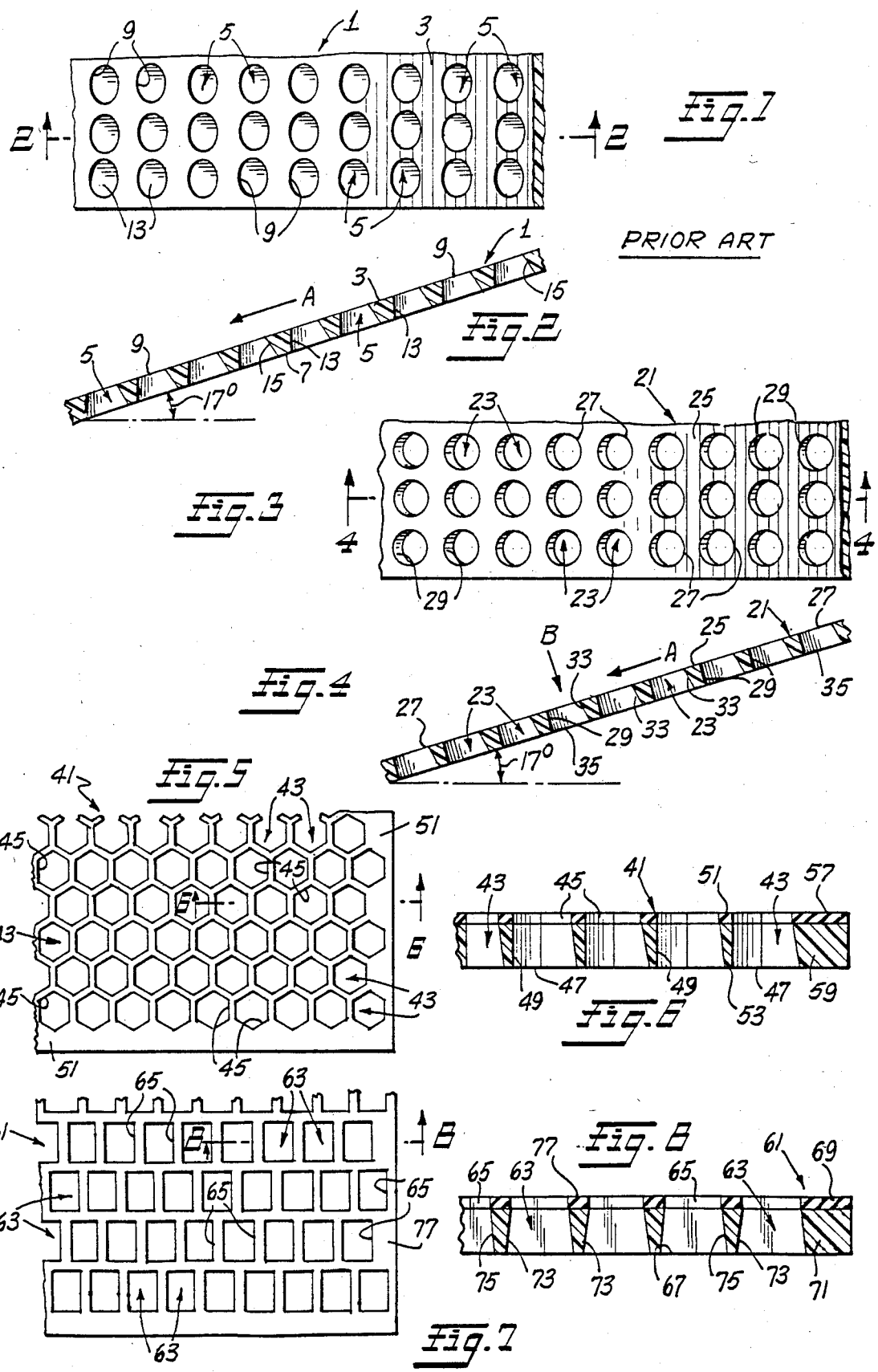

SCREEN FOR SEPARATING AND CLASSIFYING PARTICULATE MATERIAL AND METHOD OF MAKING SAME

CROSS REFERENCE TO RELATED APPLICATION

This application is a divisional application of application Ser. No. 06/458,484 filed on Jan. 17, 1983 abandoned.

BACKGROUND OF THE INVENTION

1. Field of the Invention

The present invention generally involves the field of technology pertaining to devices for separating and classifying particulate materials. More specifically, the invention relates to such a device in the form of a screen made of synthetic material and a method for making same.

2. Description of the Prior Art

The field of prior art pertaining to screens and similar appliances for separating and classifying particulate materials according to their relative sizes has been quite active and is well developed.

A specific application of such screens is in the mining and quarrying fields wherein particles of rather hard substances, such as coal, ores and rock, must undergo separation and classification for various purposes. Screens used for this purpose are necessarily subjected to severe wear conditions due to the abrasive nature of the hard particulates being processed. It is known to make these screens from either metal or synthetic materials. Metal screens are made by simply drilling or punching a metal plate to provide the necessary perforations. Synthetic screens are made by molding plastic material in a press under heat and pressure, with the perforations being formed either during the molding process or through subsequent drilling or punching of the molded body. An example of this technique wherein the perforations are formed during the molding process is disclosed by the Kramer U.S. Pat. No. 3,843,476.

The aforedescribed techniques for producing screens are characterized by fundamental disadvantages. The mechanical drilling or punching of perforations in a screen body is both time consuming and expensive. The simultaneous molding of perforations during molding of the screen body is less labor intensive and fairly economical, but the resulting perforations are not uniform in configuration and dimensions since the synthetic material is inevitably displaced in the regions of the perforations, particularly when a composite screen body formed from plural layers of different synthetic materials is being molded.

In addition to the above considerations, another important factor having a bearing on the performance of a screen is the specific disposition and configuration of the perforations. It is known to provide a screen with spaced perforations disposed in either linear arrays or staggered rows, and wherein the perforations may be any of a variety of different transverse cross-sectional configurations, including rectangular, round, hexagonal and variations of same. It has further been recognized as advantageous to provide each perforation with a substantially conical-shaped longitudinal cross-sectional configuration for defining relief angles to minimize the possibility of blinding the perforations since particulate material is always passing through a progressively larger opening. However, when a screen is disposed in a conventional inclined position of use, the particles being processed travel downwardly along the incline and impact against the top surface of the screen. Depending upon the angle of impact, the top openings of the perforations shall appear foreshortened in varying degrees to the particles, and consequently become reduced in effective screening size. Moreover, the relief angles defined by those wall portions of the perforations disposed downstream of the inclined screen are subjected to an accelerated rate of wear which exceeds that realized by their opposed upstream counterparts.

SUMMARY OF THE INVENTION

It is an object of the invention to overcome the aforementioned and other disadvantages of conventional screens for separating and classifying particulate materials by providing an improved screen of synthetic material and a method of making same.

It is another object of the invention to provide a method for efficiently and economically making a screen from synthetic materials.

It is a further object of the invention to provide an improved method for forming perforations of highly uniform configuration and dimensions in a cast or molded slab of synthetic material.

It is still another object of the invention to provide an improved screen for separating and classifying particulate materials wherein the screen is specifically intended for use in an inclined disposition and is provided with perforations specifically configured to enhance screening efficiency and extend the service life of the screen.

These and other objects of the present invention are realized by providing an improved screen for separating and classifying particulate materials wherein the screen is made by utilizing a pressurized stream of fluid to cut a plurality of spaced perforations through a slab of cast or molded synthetic material. The slab is advantageously a composite laminate comprised of plural layers of different synthetic materials, perferably a layer of curred rubber intimately bonded or vulcanized to a layer of plasticized ultrahigh molecular weight polyethylene. The forming of the perforations through the slab is accomplished by utilizing a water jet cutting tool through which a thin jet of water, under pressures of around 55,000 pounds per square inch, serves as the cutting medium. Control of the cutting system may be accomplished through the use of conventional industrial robots and computer systems.

Each perforation of the screen is preferably defined by a longitudinal cross-sectional configuration in the form of an asymmetrical taper from the bottom opening of the perforation towards its top opening, with one side wall being perpendicular to the opposed surfaces of the screen and serving as the downstream side of the perforation. The opposed side wall is angled from the perpendicular to form a relief angle and serves as the upstream side of the perforation. The transverse cross-sectional configuration of the perforations may be round, polygonal or variations thereof, and is preferably elongated in the direction of material flow to compensate for foreshortening of the effective top opening areas of the perforations when the screen is utilized in an inclined disposition.

Other objects, features and advantages of the invention shall become apparent from the following description of the preferred embodiments thereof, with reference to the accompanying drawings which form a part of the specification, wherein like reference characters designate corresponding parts of the several views.

BRIEF DESCRIPTION OF THE DRAWINGS

FIG. 1 is a partial sectional top view of a prior art screen used for separating and classifying smaller particles of a substance from larger particles thereof;

FIG. 2 is a view taken on the line 2—2 of FIG. 1, particularly showing the screen in its conventional inclined position of use;

FIG. 3 is a partial sectional top view of a screen according to a first embodiment of the invention;

FIG. 4 is a view taken along the line 4—4 of FIG. 3, particularly showing the screen in an inclined position of use;

FIG. 5 is a partial top view of a screen according to a second embodiment of the invention;

FIG. 6 is a view taken on the line 6—6 of FIG. 5;

FIG. 7 is a partial top view of a screen according to a third embodiment of the invention; and FIG. 8 is a view taken on the line 8—8 of FIG. 7.

DETAILED DESCRIPTION OF THE PREFERRED EMBODIMENTS

A prior art screen 1 is shown in FIGS. 1 and 2 disposed in an inclined position of use, wherein particulate material to be separated and classified is directed onto a top surface 3 and moved downwardly thereacross in the general direction indicated by arrow A. Screen 1 is typically inclined at an angle of about 10°–24° from the horizontal, preferably 17°, and may further be provided with a vibrating means (not shown) to facilitate the movement of particulate material across top surface 3 and through a plurality of spaced perforations 5.

As shown in FIG. 2, screen 1 is made from a molded body of synthetic material, with perforations 5 being either molded in place or mechanically formed, such as through punching or drilling, after the molding of the synthetic material. The longitudinal cross-sectional configuration of each perforation 5 is substantially conical and tapers from a bottom surface 7 towards top surface 3, thus defining a top opening 9 having the same circular configuration as its corresponding bottom opening 11 but of smaller area. The symmetrical tapering of perforations 5 in this manner from bottom surface 7 towards top surface 3 is conventionally known as providing relief angles in the walls of perforations 5 in order to prevent blinding of the latter since the particulate material being processed is always passing through progressively larger openings.

Each perforation 5, as shown in longitudinal cross section in FIG. 2, is defined by a downstream wall 13 and an opposed upstream wall 15, with both walls 13 and 15 being disposed at relief angles of approximately 5° to 10° from the longitudinal axis of perforation 5, which axis is perpendicular to top and bottom surfaces 3 and 7. Since the taper defined by walls 13 and 15 is symmetrical, walls 13 and 15 therefore form equal relief angles. However, it has been discovered that particulate material impacting upon top surface 3 of screen 1 and traveling downstream thereacross in the direction indicated by arrow A tend to impact with greater force against downstream walls 13, with only minimum impact forces being sustained by upstream walls 15. This is of course due to the inclined disposition of screen 1, with the accelerated wear being realized by downstream walls 13 serving to reduce the service life of screen 1.

When screen 1 in its inclined disposition is viewed from the top as shown in FIG. 1, top openings 9 of perforations 5 are effectively foreshortened, thereby distorting their otherwise circular configurations into substantially elliptical configurations. This foreshortening effect becomes progressively more severe when top openings 9 are viewed from directions forming decreasing angles with respect to top surface 3. It is therefore apparent that particulate material impacting upon top surface 3 of screen 1 shall in effect encounter varying degrees of foreshortening of top openings 9, depending upon the angle at which such material impacts against top surface 3. This foreshortening effect tends to hinder effective processing of particulate material by screen 1.

An improved screen 21 according to a first embodiment of the invention shall now be described with reference to FIGS. 3 and 4. As seen in FIG. 3, screen 21 includes a plurality of spaced perforations 23 disposed in linear arrays. Screen 21 includes a top surface 25 within which a top opening 27 of each perforation 23 shall appear circular in configuration, notwithstanding the inclination of screen 21 at an angle of about 17° from the horizontal. As also shown in FIG. 3, a downstream wall 29 of each perforation 23 is also visible from this direction of view. This is possible because each top opening, when viewed from a perpendicular direction as indicated by arrow B in FIG. 4, is actually elliptical in configuration, with the longitudinal axis of the ellipse being disposed parallel to the direction of material flow, as indicated by arrow A. Accordingly, particulate material impacting against top surface 25 of screen 21 from the direction of view in FIG. 3 shall encounter top openings 27 of the desired circular configuration, rather than in the foreshortened configuration previously described with reference to prior art screen 1.

As seen in FIG. 4, each downstream wall 29 is disposed substantially perpendicular to top surface 25 and a bottom surface 31, thereby defining a zero relief angle. Each downstream wall 29 has an opposed upstream wall 33 which is disposed in a relief angle of about 5° to 10° from the longitudinal axis of each perforation 23. In this configuration, walls 29 and 33 still converge towards top surface 25, but in the form of an asymmetrical taper. Since downstream walls 29 do not define relief angles, they present surfaces that are more wear resistant to the impact of particulate material being processed, thereby providing enhanced perforation control as downstream walls 29 recede from wear. This situation greatly extends the overall service life of screen 21.

It is understood that each top opening 27 of each perforation 23 has an opposed bottom opening 35 of substantially the same configuration, in this case elliptical, with the area of top opening 27 being smaller than that of bottom opening 35 because of the relief angle defined by upstream side 33. Therefore, the transverse cross-sectional configuration of each perforation 23 shall be elliptical and increase in area from top opening 27 down to bottom opening 35. Openings 27 of perforations 23 have been described as being elliptical for the purpose of compensating for the foreshortening effect so that openings 27 shall ultimately appear circular when screen 21 is used in an inclined disposition of about 10°–24° from the horizontal, though preferably 17°. Nevertheless, top openings 27 may assume other geometric configurations including hexagonal, rectangular or the like, which are elongated up to about 10% when viewed in the direction of arrow B but assume substantially their standard geometric proportions when viewed in the general directions of particulate material flow against top surface 25 of screen 21.

A second embodiment of the invention shall now be described with reference to FIGS. 5 and 6. A screen 41 according to this embodiment is provided with a plurality of spaced perforations 43 disposed in a staggered array with each perforation 43 including a hexagonal-shaped top opening 45 and a corresponding hexagonal-shaped bottom opening 47. A downstream wall 49 of each perforation 43 is disposed perpendicular to a top surface 51 and a bottom surface 53 of screen 41. Each perforation 43 further includes an upstream wall 55 disposed at an angle of about 5° to 10° from the longitudinal axis of perforation 43 to define a relief angle. Accordingly, downstream and upstream walls 49 and 55 form an asymmetrical taper which converges towards top surface 51. Though the transverse cross-sectional configuration of each perforation 43 is that of a regular hexagon, it is preferred that such configuration be elongated approximately 10% to compensate for the foreshortening effect when screen 41 is utilized in an inclined disposition.

With specific reference to FIG. 6, screen 41 is made from a composite of layers of different synthetic materials, including a first layer 57 and a second layer 59 bonded to each other through vulcanizing or chemical bonding, such as gluing. A preferred method of bonding may be vulcanizing as taught by the aforementioned Kramer U.S. Pat. No. 3,843,476, the entire disclosure of which is incorporated herein. Layer 57 is preferably thicker than layer 59, with the upper surface of the former layer defining top surface 51 of screen 41. It is further preferred that layer 57 be of elastomeric material, such as rubber or the like. Layer 59 is preferably of a synthetic polymer, such as polyethylene, and of a thickness equal to about ⅓ to ½ the total thickness of screen 41. Screen 41 may be made by disposing a first layer of ultrahigh molecular weight polyethylene powder into the bottom of a platen press mold cavity. A sheet of uncured rubber is then laid over the polymer powder. Subsequent application of heat and pressure to the mold serves to cure the rubber and plasticize the polymer, thereby resulting in an intimate bonding of the two resulting layers.

A third embodiment of the invention shall now be described with reference to FIGS. 7 and 8. In this embodiment, a screen 61 includes a plurality of spaced perforations 63 disposed in a staggered array. Each perforation 63 has a substantially rectangular transverse cross-sectional configuration and includes a top opening 65 and a corresponding bottom opening 67. Screen 61 is also preferably formed of different synthetic materials and includes a first layer 69 of cured rubber bonded to a second layer 71 of plasticized polyethylene. Each perforation 63 is provided with a downstream wall 73 and an upstream wall 75. Both walls 73 and 75 are disposed in relief angles of approximately 5° to 10° from the longitudinal axis of each perforation 63. Accordingly, walls 73 and 75 converge towards a top surface 77 in a symmetrical taper. It is further understood that the transverse cross-sectional configuration of each perforation 63 may also be elongated up to about 10% in the direction of material flow when screen 61 is utilized in an inclined disposition.

The screens according to the above embodiments of the invention have been described as being made from synthetic materials, preferably plural layers or different layers of synthetic materials bonded together to define a composite laminate. The formation of the required spaced perforations in a screen made of synthetic material has heretofore been accomplished by either directly molding perforations during molding of the synthetic material or by mechanical drilling or punching the perforations after the screen body has been molded. As previously indicated, the latter approach is both expensive and labor intensive. The formation of the perforations during the molding of the screen body does not produce perforations of uniform configuration and dimensions because the material being molded has the tendency to be displaced in the regions of the perforations. This problem is particularly acute when plural layers of different synthetic materials are simultaneously molded to form a composite screen body. In such case, the respective thicknesses of the individual layers would not be uniform and produces variations in cross-sectional appearance. These variations have been identified with accelerated degradation of the screen during use.

An important aspect of the present invention resides in an improved method for making a screen from synthetic materials. More specifically, this method permits the efficient and economical forming of the required perforations in a screen body formed from one or more layers of synthetic material. Moreover, the method produces perforations of highly uniform and controlled configuration and dimensions, and especially without the displacement of the synthetic material in the regions of the perforations.

The method of this invention is accomplished by cutting perforations in a body of synthetic material by the use of a pressurized stream of fluid, such as water. The use of pressurized fluids for cutting purposes is known and generally involves utilizing a thin jet of water subjected to pressures of about 55,000 pounds per square inch as the cutting tool. The use of such water jets for cutting the perforations in a slab of synthetic material for making a screen in the practice of the present invention results in a screen having perforations of extremely uniform configuration and dimensions, characterized by sharp edges, and without displacement of different layers of synthetic materials in the regions of the perforations. Through the use of such pressurized water jets, precise control can be exercised over the actual cutting of the perforations, thereby producing consistent and predictable results.

Water jet cutting tools used in the practice of the invention may be any known in the art and deemed suitable for cutting the synthetic materials forming the screen body. Fluid jet cutting systems of this type are disclosed by the Leslie et al U.S. Pat. No. 3,978,748 and Pearl U.S. Pat. No. 4,312,254, the entire disclosures of these patents being herein incorporated by reference. Moreover, suitable pressurized fluid cutting tools and control systems therefor may be those manufactured by Flow Systems, Inc., 21414 68th Avenue, South Kent, Wash. 98031 under the trademarks Waternife ™, Instajet ™, and Jetdrill ™.

While the invention has been described and illustrated with reference to certain preferred embodiments thereof, it shall be understood and appreciated that various modifications, changes, additions, omissions and substitutions may be resorted to by those skilled in the art and considered to be within the spirit and scope of the invention and the appended claims.

We claim:

1. An improved screen for separating and classifying smaller particles of a substance from larger particles thereof, wherein the screen is of a substantially planar configuration including a top surface, a bottom surface and a plurality of spaced perforations of substantially uniform configuration and dimensions therethrough for passing the smaller particles through the screen, the improvement comprising substantially all of the perforations each including a longitudinal cross-sectional configuration defined by:
   (a) a straight wall disposed substantially perpendicular to the top and bottom surfaces;
   (b) an inclined wall disposed opposite the straight wall for defining a relief angle;
   (c) wherein both walls form an asymmetrical taper converging towards the top surface; and
   (d) the straight walls being positioned at the downstream side and the inclined walls being positioned at the upstream side of the screen when the screen is disposed in an inclined position of use.

2. The screen of claim 1 wherein the screen is of synthetic material.

3. The screen of claim 2 wherein the screen is formed of plural layers of different synthetic materials.

4. The screen of claim 2 wherein the screen includes a composite laminate defined by a layer of polymer material and a layer of elastomeric material.

5. The screen of claim 4 wherein the polymer material includes plasticized ultrahigh molecular weight polyethylene and the elastomeric material includes cured rubber.

6. The screen of claim 1 wherein substantially all the perforations are formed in the screen by means of a pressurized stream of fluid.

7. The screen of claim 1 wherein the transverse cross-sectional configuration of each perforation is substantially circular.

8. The screen of claim 1 wherein the transverse cross-sectional configuration of each perforation is substantially rectangular.

9. The screen of claim 1 wherein the transverse cross-sectional configuration of each perforation is substantially elliptical.

10. The screen of claim 1 wherein the transverse cross-sectional configuration of each perforation is substantially hexagonal.

11. The screen of claim 1 wherein the transverse cross-sectional configuration of each perforation is substantially that of an elongated polygon.

12. The screen of claim 1 wherein the spaced perforations are disposed in linear arrays.

13. The screen of claim 1 wherein the spaced perforations are disposed in a staggered array.

* * * * *